United States Patent
Lim et al.

(10) Patent No.: US 8,911,899 B2
(45) Date of Patent: Dec. 16, 2014

(54) APPARATUS FOR PROTECTING BATTERY PACK

(75) Inventors: Do Kyoung Lim, Gyeonggi-do (KR); Suk Hyung Kim, Gyeonggi-do (KR); Jae Hoon Choi, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 553 days.

(21) Appl. No.: 13/323,242

(22) Filed: Dec. 12, 2011

(65) Prior Publication Data
US 2013/0040189 A1  Feb. 14, 2013

(30) Foreign Application Priority Data
Aug. 10, 2011 (KR) .................. 10-2011-0079634

(51) Int. Cl.
H01M 2/02 (2006.01)
H01M 2/34 (2006.01)
H01M 2/10 (2006.01)

(52) U.S. Cl.
CPC ............ *H01M 2/1077* (2013.01); *H01M 2/347* (2013.01); *H01M 2220/20* (2013.01)
USPC ........................................ 429/163

(58) Field of Classification Search
None
See application file for complete search history.

(56) References Cited

U.S. PATENT DOCUMENTS

2003/0044677 A1*  3/2003  Naruoka .................. 429/161
2009/0029242 A1*  1/2009  Hirakawa .................. 429/129

FOREIGN PATENT DOCUMENTS

KR   2008-0041657 A   5/2008
KR      101036067 B1   5/2011

\* cited by examiner

*Primary Examiner* — Patrick Ryan
*Assistant Examiner* — Wyatt McConnell
(74) *Attorney, Agent, or Firm* — Edwards Wildman Palmer LLP; Peter F. Corless

(57) ABSTRACT

Provided is an technique for protecting a battery pack, in which an insulating film member and a support member are installed in a housing surrounding the battery pack, and the insulating film member is wound around and unwound from the support member fixedly installed in the housing. The technique prevents a short circuit from being caused by a conductive object penetrating into a high-capacity battery used in an HEV, PHEV or EV, so that it can prevent ignition and smoke from being generated by the battery as a result. The technique is configured to mount a battery of an HEV, PHEV or EV within a spatial margin and increase safety in the event of a collision. The technique can be applied to all vehicles using electricity in addition to the HEV, PHEV or EV.

14 Claims, 4 Drawing Sheets

APPARATUS FOR PROTECTING BATTERY PACK

CROSS-REFERENCE TO RELATED APPLICATION

This application claims under 35 U.S.C. §119(a) the benefit of Korean Patent Application No. 10-2011-0079634 filed on Aug. 10, 2011, the entire contents of which are incorporated herein by reference.

BACKGROUND OF THE INVENTION

1. Field of the Invention

The present invention relates to a technique for protecting a battery pack, in which an insulating film member and a support member are installed in a housing surrounding the battery pack, and the insulating film member is designed to be wound around the support member fixedly installed in the housing so that it is able to be unwound from the support member.

2. Description of the Related Art

The high-voltage system of a hybrid electric vehicle (HEV), a plug-in hybrid electric vehicle (PHEV), or an electric vehicle (EV) is made up of a high-voltage battery, an inverter, a low voltage DC-to-DC converter (LDC), an electromotive compressor, and a high-voltage motor (FIG. 1). To drive typical electric and electronic components other than these high-voltage components, an auxiliary battery (e.g., a 12V lead acid battery) is used.

To meet the energy and capacity requirements, a battery cell stack and module are provided in a restricted space of the HEV, PHEV or EV. However, there is no spatial margin between battery cells except for a cooling channel nor is there a margin between batteries irrespective of if it is a serial or parallel connection.

With the electric motorization of the HEV, PHEV or EV, the space for mounting the battery becomes limited. Thus, mounting the battery in a tire well, a dead space typically used to store a tire and tools, has been considered. However, when the battery is installed in the tire well, there is the possibility that the battery will be punctured by a sharp object or a beam during a rear-end collision. Thus, there is safety issues associated with its placement (FIG. 2). In detail, when an object, e.g., a nail, punctures a battery pack, battery cells become punctured thereby causing a short circuit.

The above information disclosed in this Background section is only for enhancement of understanding of the background of the invention, and therefore it may contain information that does not form the prior art that has already been known to those of ordinary skill in the art.

SUMMARY OF THE INVENTION

The present invention prevents a short circuit between cells of a battery pack when the battery pack has been punctured by a sharp object, e.g., a nail, due to a rear-end collision. In particular, an apparatus is installed with an insulating film member and a support member in a housing surrounding the battery pack and is configured with an insulating film member wound around the support member fixedly installed in the housing so that it can be unwound therefrom when necessary to prevent a short circuit caused by a conductive object penetrating into the battery pack Thus, the exemplary embodiment of the present invention secures the safety of the battery pack.

According to one aspect of the present invention, there is provided an apparatus for protecting a battery pack, which comprises: a housing surrounding the battery pack; and an insulating film member and a support member installed in the housing. The insulating film member is wound around the support member fixedly installed in the housing so as to be able to be unwound therefrom.

The present invention prevents a short circuit between the cells of a battery pack when a sharp object punctures and penetrates the battery pack as a result of the vehicle being in a collision.

According to exemplary embodiments, the insulating film member and the support member may be installed in the housing, and the insulating film member may be wound around the support member fixedly installed in the housing so as to be able to be unwound. The insulating film member may be formed of a fiber material or a synthetic resin material of an elastic insulator and may be wound around or folded on the support member fixedly installed in the housing so as to be able to be unwound.

According to exemplary embodiments, the insulating film member may be configured to be divided into a plurality of components and may be installed on all faces, that is, the front and rear faces, the upper and lower faces, and the left and right faces, of the inside of the housing.

According to exemplary embodiments, the battery pack may be a battery pack of a hybrid electric vehicle (HEV), a plug-in hybrid electric vehicle (PHEV), or an electric vehicle (EV).

The features and advantages of the present invention are summarized as follows.

(1) The battery pack protecting apparatus is characterized in that an insulating film member and a support member are installed in a housing surrounding the battery pack, and that the insulating film member is wound around the support member fixedly installed in the housing so as to be able to be unwound.

(2) The battery pack protecting apparatus prevents a short circuit caused by a conductive object penetrating into a high-capacity battery used in an HEV, PHEV or EV, so that it can prevent ignition and smoke from being generated by the battery.

(3) The battery pack protecting apparatus is configured to be mounted without taking up a large amount of volume of battery space of the HEV, PHEV or EV in a tire well, so that the battery can be mounted within a spatial margin and provide safety in case of a collision.

(4) The battery pack protecting apparatus can be applied to all vehicles using a battery pack in addition to the HEV, PHEV or EV.

BRIEF DESCRIPTION OF THE DRAWINGS

The above and other objects, features and further advantages of the present invention will be more clearly understood from the following detailed description when taken in conjunction with the accompanying drawings, in which.

DETAILED DESCRIPTION OF THE INVENTION

Figure 1:
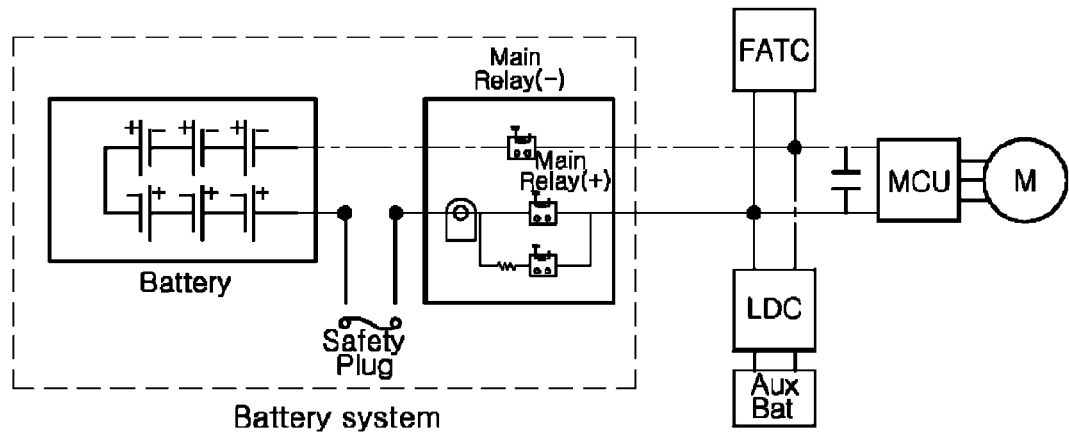
FIG. 1 schematically shows the conventional configuration of a high-voltage system for an HEV, a PHEV or an EV.
Figure 2:
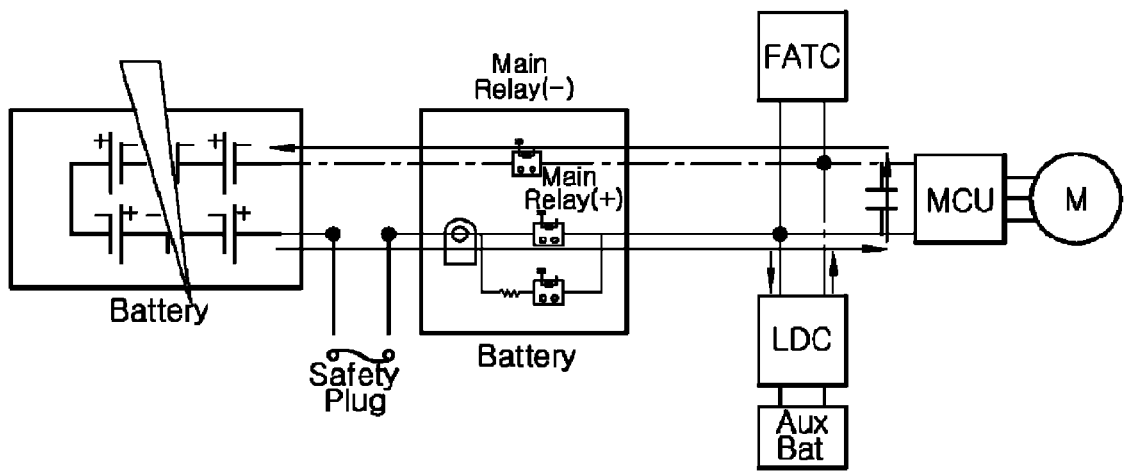
FIG. 2 schematically shows how physical shock is applied to a battery system.

Reference will now be made in greater detail to exemplary embodiments of the invention with reference to the accompanying drawings. These embodiments are merely provided to serve as illustrations that exemplify the present invention. Therefore, it will be apparent to those of ordinary skill in the art that the scope of the present invention is not restricted by these embodiments.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

An apparatus for protecting a battery pack according to an embodiment of the present invention will be described below in detail with reference to the accompanying drawings.

The battery pack protecting apparatus 50 is configured so that an insulating film member 30 and a support member 40 are installed in a housing 20 surrounding a battery pack 10, and that the insulating film member 30 is wound around the support member 40 fixedly installed in the housing 20 so as to be able to be unwound from the support member.

Figure 3:
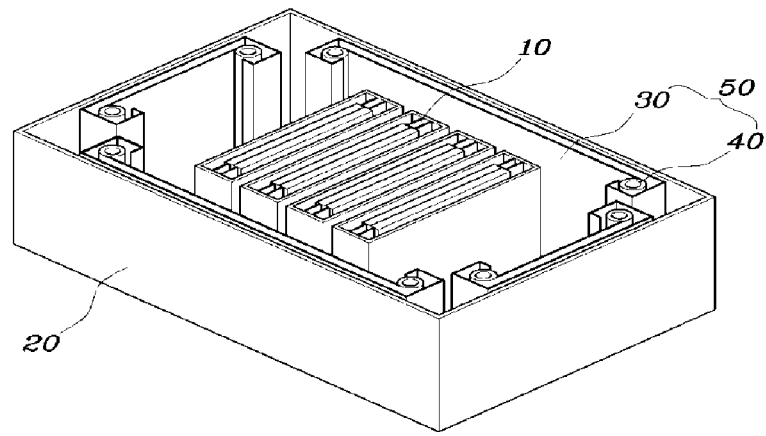
FIG. 3 is a perspective view showing a battery having an apparatus for protecting a battery pack according to an exemplary embodiment of the present invention.

As can be seen from FIG. 3, according to an exemplary embodiment, the insulating film member 30 and the support member 40 of the battery pack protecting apparatus 50 are installed in the housing 20, and the insulating film member 30 is wound around the support member 40 fixedly installed in the housing 20 so as to be able to be unwound therefrom.

When physical shock is applied to the battery pack 10 (e.g., because an electric vehicle having the battery pack 10 was involved in a collision), and particularly when an conductive object 60 such as a nail penetrates a battery case or duct, there is a possibility of battery cells may become continuously connected forming an external short circuit. Thus, the battery pack protecting apparatus 50 fundamentally prevents the external short circuit from leading to ignition.

The insulating film member 30 installed in the housing 20 surrounding the battery pack 10, has elasticity capable of absorbing external shocks, and should be electrical non-conductivity and capable of being flexible deformed in shape. Preferably, the insulating film member 30 is formed of a fiber or the synthetic resin material acting as an elastic insulator.

As another exemplary embodiment, the fiber material of the elastic insulator may be a fabric formed of at least one selected from a group consisting of carbon fiber, fiberglass, and long aramid fiber. The fabric is characterized as being weaved in a crisscross pattern. The term aramid is a generic name of aromatic polyamid fabrics, and is divided into two types. One of the two types is a meta type, and the other type is a para type. The meta type has a melting point of 320 degrees centigrade, has excellent heat resistance, fire resistance, and flame resistance, and thus is used in aircrafts, safety clothing, industrial filters, and so forth. The para type has high strength, a high melting point of 570 degrees centigrade or more, and a high modulus, and thus is used for the lightweight composite materials of aircraft, industrial materials such as tire cords, and so forth. The aramid fiber is stronger than steel fiber, and is excellent in flexure resistance and thermal resistance. Thus, in the present invention, it is preferable to select the type of aramid fiber according to the use of a structure that it is to be applied to.

The aramid fibers are five times as strong as steel of the same weight, and do not burn at 500 degrees centigrade. The aramid fibers are applied to various industrial fields such as high-functionality materials that show high resistance to chemicals, high-performance tires, hoses, optical cable reinforcements, bulletproof materials, etc. due to their high wear resistance, light weight, and easy processing. The aramid fibers are expected to remarkably contribute to a reduction in material weight in place of steel, and are expected to be able to effectively replace industrial materials causing pollution such as asbestos, fiberglass, etc. that are gradually regulated all over the world.

As another exemplary embodiment, the synthetic resin material of the elastic insulator is an elastic polymer based on one or both of thermoplastic and thermosetting materials Here, the thermosetting material includes at least one selected from epoxy resin, phenol resin, polyimide resin, and polyester resin. Further, the thermoplastic material includes at least one selected from polyolefin, polyester, polyamide, polyacrylate, polycarbonate, polysulfone, polyamideimide, polyetherimide, polyetherketone, polyetheretherketone, polyethersulfone, and polyphenylene sulfide.

The term "elastic polymer" used herein refers to a polymeric material which is able to increase in length when pushed or pulled by an external force and able to return to its original length when the external force is removed. These types of materials are typically called an elastomer. A representative example of the elastic polymer is vulcanized rubber called an elastic rubber. The reason the elastic polymer is lengthened by the application of the force is because long linear polymer chains slip to increase the overall length. However, since bridges (e.g., in the vulcanized rubber, —S—S— bridges) are cross-linked, deformed bridges return to their original stable state by molecular motion when the applied force is removed.

As yet another embodiment, the insulating film member 30 alternatively be folded on the support member 40 fixedly installed in the housing so as to be able to be unwound.

When the insulating film member 30 is wound around the support member 40 so as to be able to be unwound refers to a roll type embodiment. The roll type embodiment means that, when the insulating film member 30 is wound around a roll and is subjected to an external shock, for instance being penetrated by an object 60 such as a nail, the insulating film member 30 wound around the roll is unwound in accordance with the force applied by the object 60 enclosed, thereby protecting the cells in the battery pack 10 from coming in contact with the object 60.

When the insulating film member 30 is folded on the support member 40, the insulating film member 30 is folded in a corrugated shape. This structure means that, when the insulating film member 30 is subject to an external shock, for instance being penetrated by an object 60 such as a nail, in a folded state, the insulating film member 30 unfolds and is stretched with the nail 60 enclosed, thereby protecting the cells in the battery pack 10.

As yet another embodiment, the insulating film member 30 may be configured to be divided into a plurality of components. That is, the support member 40 fixing and supporting the insulating film member 30 may be configured to be divided into a plurality of components according to a structure of the housing 20. For example, when the housing 20 has a hexahedral shape, the support members 40 are installed in a pair for opposite ends of one face of the housing. Thus, the support members 40 are installed adjacent to the opposite ends of four faces of the hexahedral housing 20, so that the insulating film member 30 may be configured to be divided accordingly. The narrower the interval between the support members 40 installed on each corner of the housing becomes, the wider the protecting area of the battery pack 10 which is protected from an object 60 which becomes.

The insulating film members 30 may be installed on front and rear faces, upper and lower faces, and left and right faces of the inside of the housing 20. This ensures that the battery pack is protected in all directions. Furthermore, by installing the insulating film member 30 in this manner, the present invention is able to protect the battery pack 10 from external physical shock even when the shape of the battery housing 20 varies. Thus, due to the installation of these insulating film members 30, it is possible to protect the battery pack 10 from vertical and horizontal penetration of the object 60.

Figure 4:
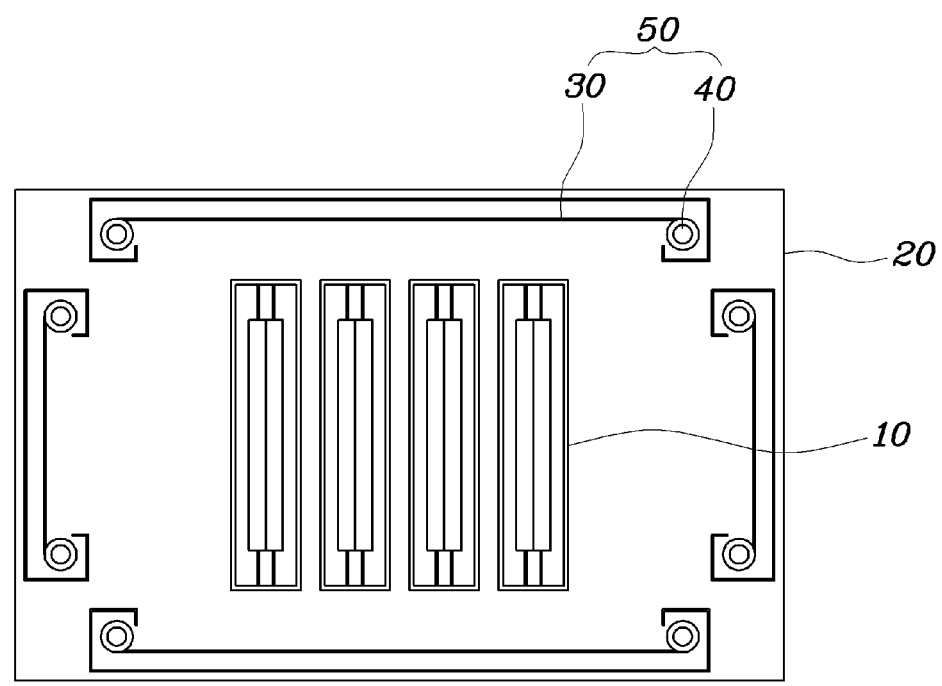
FIG. 4 is a top-down view showing the battery having the apparatus for protecting a battery pack according to the exemplary embodiment of the present invention.
Figure 5:
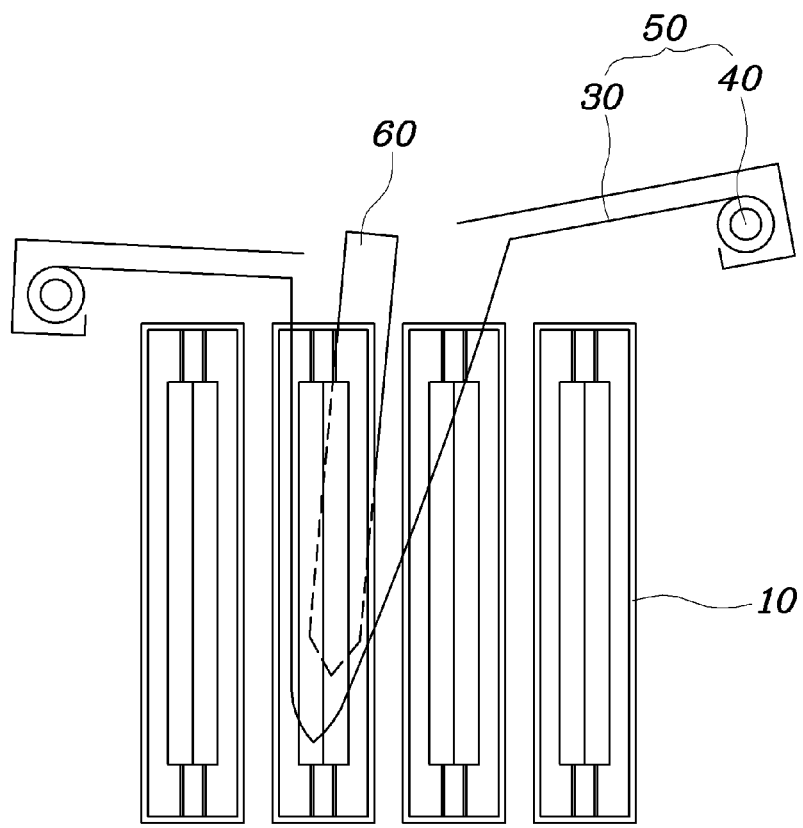
FIG. 5 shows how the battery having the apparatus for protecting a battery pack according to the exemplary embodiment of the present invention offers protection against the penetration of a nail.

FIG. 4 is a top-down view showing a battery on which the battery pack protecting apparatus 50 is installed. FIG. 5 shows how the battery pack protecting apparatus 50 operates when an object 60 such as a nail penetrates a battery. Referring to FIG. 5, when physical shock is applied to a battery by an object 60 such as a nail, the insulating film member 30 formed of an insulator having elasticity and flexibility is unwound from the support member 40 with the object 60 enclosed, thereby protecting the battery cells and preventing a short circuit from forming between the cells.

The battery pack 10 refers to battery packs 10 of all vehicles using electricity as a power source, and preferably to a battery pack 10 of a plug-in hybrid electric vehicle (PHEV), a hybrid electric vehicle (HEV), or an electric vehicle (EV). That is, the battery pack protecting apparatus 50 may be applied to all the vehicles having the battery pack 10, but preferably at least to the HEV, PHEV, or EV. The battery having the battery pack protecting apparatus 50 is mounted in a tire well of the HEV, PHEV, EV, etc., so that the battery can be mounted within a specific spatial margin and is safe in the event of a collision.

Figure 6:
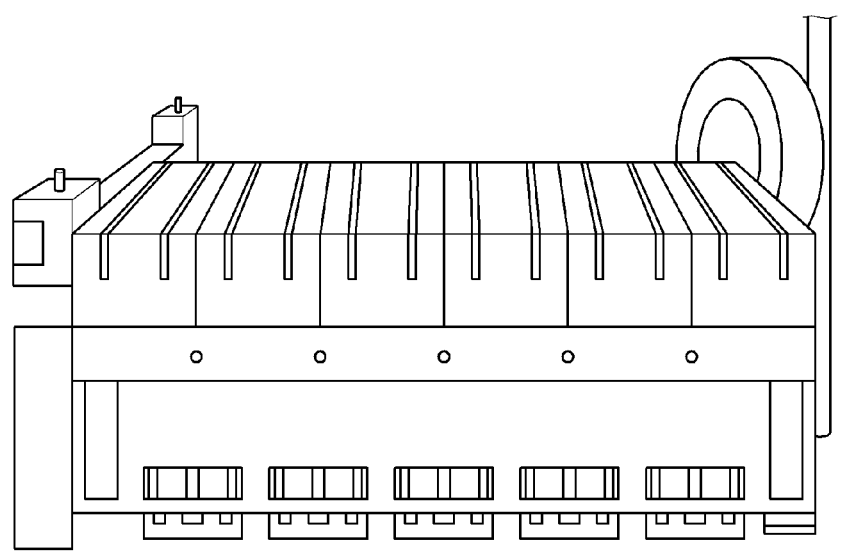
FIG. 6 is a photograph showing a nail penetration test.

FIG. 6 is a photograph showing a penetration test conducted on the penetration of a nail into a battery. The nail penetration test penetrates a battery at a predetermined speed using a pointed object, intentionally induces an internal short circuit by which positive and negative electrodes are connected to each other, and observes ignition and explosion of the battery.

Figure 7:
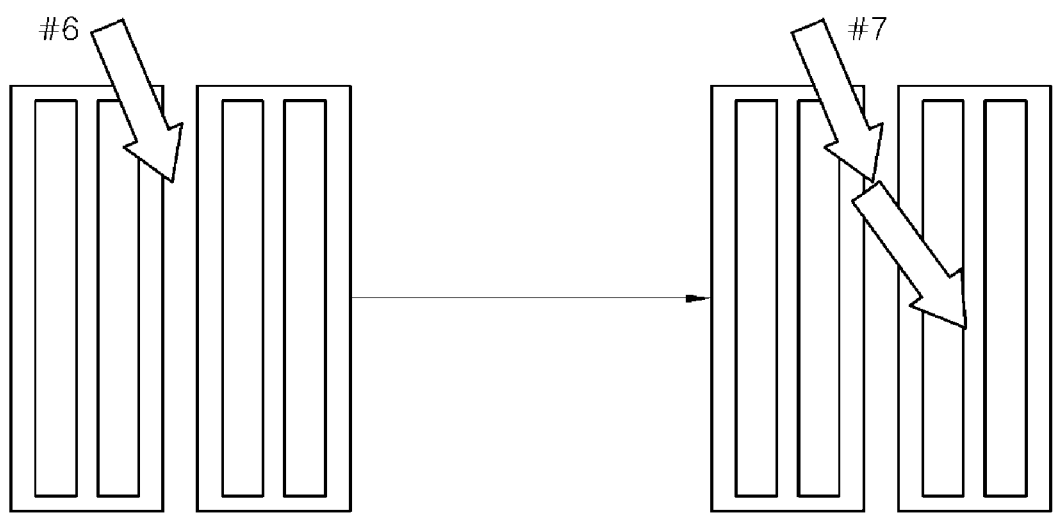
FIG. 7 schematically shows a process of the nail penetrating a cell of a battery module and the cell adjacent thereto.

Referring to FIG. 7, it is shown that the object 60 (in this case a nail) penetrates the sixth and seventh cells of a module. In the case where the battery pack protecting apparatus 50 is not provided, the nail 60 penetrates an upper end of the sixth cell, and then proceeds to the seventh cell at a different angle Thus, the present invention also limits the penetration of the object into the battery pack as well.

Figure 8:
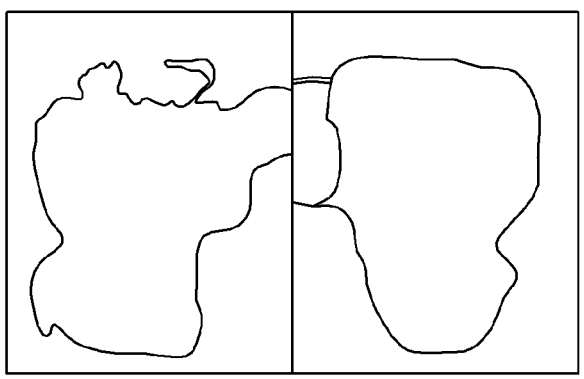
FIG. 8 is a photograph showing a battery ignited by a battery pack being penetrated by a nail.

Referring to FIG. 8, it is shown that secondary smoke is followed by ignition due to an external short circuit caused by the electrical connection between the two cells connected in series and the object 60.

Although exemplary embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. An apparatus for protecting a battery pack, comprising:
a housing surrounding the battery pack; and
an insulating film member and a support member installed in the housing,
wherein the insulating film member is unwound from the support member upon external force from a foreign object.

2. The apparatus as set forth in claim 1, wherein the insulating film member is wound around the support member fixedly installed in the housing so as to be able to be unwound from the support member upon external force from the foreign object.

3. The apparatus as set forth in claim 1, wherein the insulating film member is formed of a fiber material or a synthetic resin material of an elastic insulator.

4. The apparatus as set forth in claim 1, wherein the insulating film member is wound around or folded on the support member fixedly installed in the housing so as to be able to be unwound from the support member upon external force from the foreign object.

5. The apparatus as set forth in claim 1, wherein the insulating film member is configured to be divided into a plurality of components surrounding the battery.

6. The apparatus as set forth in claim 1, wherein the insulating film member is installed on the front and rear faces, upper and lower faces, and left and right faces of an inside of the housing.

7. The apparatus as set forth in claim 1, wherein the battery pack is a battery pack of a hybrid electric vehicle (HEV), a plug-in hybrid electric vehicle (PHEV), or an electric vehicle (EV).

8. A battery assembly, comprising:
a battery pack installed in a trunk of a vehicle;
a housing surrounding the battery pack; and
an insulating film member and a support member installed in the housing to protect,
wherein the insulating film member is unwound from the support member upon external force from a foreign object, the insulating film member protecting the battery pack from short circuiting when an object penetrates the housing and the battery pack.

9. The battery assembly as set forth in claim 8, wherein the insulating film member is wound around the support member fixedly installed in the housing so as to be able to be unwound from the support member upon external force from the foreign object.

10. The battery assembly as set forth in claim 8, wherein the insulating film member is formed of a fiber material or a synthetic resin material of an elastic insulator.

11. The battery assembly as set forth in claim 8, wherein the insulating film member is wound around or folded on the support member fixedly installed in the housing so as to be able to be unwound from the support member upon external force from the foreign object.

12. The battery assembly as set forth in claim 8, wherein the insulating film member is configured to be divided into a plurality of components surrounding the battery.

13. The battery assembly as set forth in claim 8, wherein the insulating film member is installed on the front and rear faces, upper and lower faces, and left and right faces of an inside of the housing.

14. The battery assembly as set forth in claim 8, wherein the battery pack is installed in a hybrid electric vehicle (HEV), a plug-in hybrid electric vehicle (PHEV), or an electric vehicle (EV).

* * * * *